United States Patent
Ponchak et al.

(10) Patent No.: US 10,450,882 B2
(45) Date of Patent: Oct. 22, 2019

(54) ANTI-ROTATION SHIM SEAL

(71) Applicant: United Technologies Corporation, Hartford, CT (US)

(72) Inventors: Jeffrey D Ponchak, North Berwick, ME (US); Jessica M. Lucier, Wells, ME (US); Mark J. Rogers, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 989 days.

(21) Appl. No.: 15/077,000

(22) Filed: Mar. 22, 2016

(65) Prior Publication Data

US 2017/0276006 A1 Sep. 28, 2017

(51) Int. Cl.
| | |
|---|---|
| *F02C 7/28* | (2006.01) |
| *F01D 11/00* | (2006.01) |
| *F01D 9/04* | (2006.01) |
| *F01D 25/24* | (2006.01) |
| *F04D 29/08* | (2006.01) |

(52) U.S. Cl.
CPC .............. *F01D 11/003* (2013.01); *F01D 9/04* (2013.01); *F01D 25/243* (2013.01); *F01D 25/246* (2013.01); *F02C 7/28* (2013.01); *F04D 29/083* (2013.01); *F05D 2220/32* (2013.01); *F05D 2240/55* (2013.01); *F05D 2240/56* (2013.01); *F05D 2240/57* (2013.01); *F05D 2240/58* (2013.01); *F05D 2260/30* (2013.01); *Y02T 50/671* (2013.01)

(58) Field of Classification Search
CPC ...... F01D 25/246; F01D 25/265; F01D 9/042; F01D 9/023; F05D 2220/3212; F05D 2220/3219; F05D 11/005; F16L 17/08; F16L 23/18; F16L 23/20; F16L 23/24; F16L 23/036; F16J 15/02; F16J 15/06; F16J 15/062; F16J 15/021; F16J 15/10; F16J 15/102; F16J 15/104; F16J 15/106

See application file for complete search history.

(56) References Cited

U.S. PATENT DOCUMENTS

| | | | |
|---|---|---|---|
| 4,431,373 A | 2/1984 | Monsarrat | |
| 4,784,012 A * | 11/1988 | Marra | F01D 5/027 |
| | | | 415/119 |

(Continued)

FOREIGN PATENT DOCUMENTS

| | | |
|---|---|---|
| EP | 2327858 A2 | 6/2011 |
| GB | 2433965 A | 7/2007 |

OTHER PUBLICATIONS

Extended European Search Report, for European Patent Application No. 17162314.3, dated Aug. 16, 2017, 9 pages.

*Primary Examiner* — Todd E Manahan
*Assistant Examiner* — Eric W Linderman
(74) *Attorney, Agent, or Firm* — Kinney & Lange, P.A.

(57) ABSTRACT

An interface arrangement includes two annular components that extend along an axis and are in contact with one another and a third component that is positioned radially inward from at least one of the two components. There is an anti-rotation feature on one of the three components that engages an anti-rotation feature on an annular seal member. The seal member is in contact with the first two components and is positioned between the third component and at least one of the first two components.

17 Claims, 4 Drawing Sheets

(56) References Cited

U.S. PATENT DOCUMENTS

| | | | | |
|---|---|---|---|---|
| 4,835,827 | A * | 6/1989 | Marra | F01D 5/027 29/407.01 |
| 5,232,340 | A * | 8/1993 | Morgan | F01D 9/042 415/190 |
| 5,423,659 | A * | 6/1995 | Thompson | F01D 25/246 415/139 |
| 5,582,077 | A * | 12/1996 | Agram | F01D 5/027 403/318 |
| 5,846,050 | A | 12/1998 | Schilling | |
| 6,296,443 | B1 | 10/2001 | Newman et al. | |
| 7,600,967 | B2 * | 10/2009 | Pezzetti, Jr. | F01D 11/005 415/115 |
| 8,313,289 | B2 * | 11/2012 | Caprario | F01D 5/3015 415/173.7 |
| 8,337,090 | B2 * | 12/2012 | Herborth | F01D 25/164 384/215 |
| 8,348,616 | B2 * | 1/2013 | Williams | F01D 5/027 416/119 |
| 9,228,447 | B2 | 1/2016 | McCaffrey | |
| 9,297,258 | B2 * | 3/2016 | Woods | F01D 5/027 |
| 9,327,368 | B2 * | 5/2016 | Hagan | F02C 7/28 |
| 9,677,427 | B2 * | 6/2017 | Synnott | F01D 25/246 |
| 2006/0216143 | A1 * | 9/2006 | Trinks | F01D 9/04 415/173.1 |
| 2010/0011780 | A1 * | 1/2010 | Varney | F01D 25/243 60/796 |
| 2014/0248128 | A1 | 9/2014 | Budnick et al. | |
| 2014/0345249 | A1 * | 11/2014 | Fukuda | F02C 7/10 60/39.511 |
| 2015/0121880 | A1 * | 5/2015 | Kidder | F02C 3/04 60/726 |
| 2015/0377047 | A1 | 12/2015 | Prestel et al. | |
| 2016/0237824 | A1 * | 8/2016 | Himes | F04D 29/662 |
| 2016/0362994 | A1 * | 12/2016 | Anglin | F01D 5/025 |
| 2018/0238193 | A1 * | 8/2018 | Baucco | F01D 25/246 |
| 2018/0328228 | A1 * | 11/2018 | Englehart | F01D 9/041 |

* cited by examiner

ANTI-ROTATION SHIM SEAL

BACKGROUND

The present invention relates generally to interface arrangements, and more particularly to the interface arrangements between multiple components of a gas turbine engine.

A gas turbine engine typically includes a high pressure spool, a combustion system, and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

Each of the high pressure spool, the combustion system, and the low pressure spool comprise many different components that are connected together in various ways at various locations. In addition to connecting two or more parts, the interfaces between parts may require certain qualities such as sealing, shimming, or preventing relative rotation (i.e., anti-rotation). Each of these qualities is often accomplished by having an additional component at the particular joint, with each component having a single function. Unfortunately, additional component adds weight, cost, and increases the length of time that is required to assemble the engine.

SUMMARY

In one embodiment, an interface arrangement includes two annular components that extend along an axis and are in contact with one another and a third component that is positioned radially inward from at least one of the two components. There is an anti-rotation feature on one of the three components that engages an anti-rotation feature on an annular seal member. The seal member is in contact with the first two components and is positioned between the third component and at least one of the first two components.

DETAILED DESCRIPTION

Figure 1:
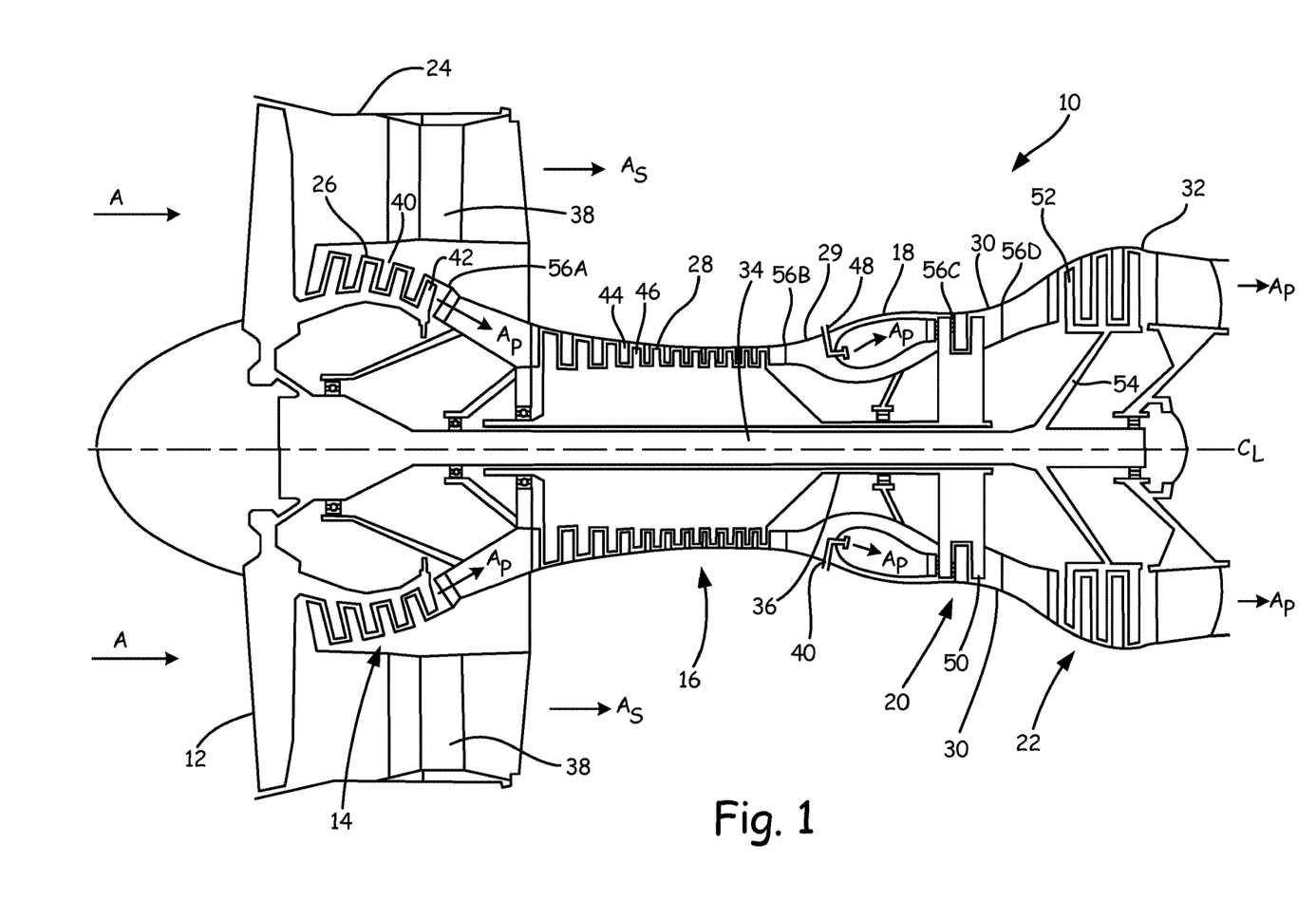
FIG. 1 is a schematic side cross-section view of a gas turbine engine.

FIG. 1 is a schematic side cross-section view of gas turbine engine 10. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, exit guide vanes 38, LPC stator vanes 40, LPC rotor blades 42, HPC stator vanes 44, and HPC rotor blades 46, injectors 48, HPT rotor blades 50, LPT rotor blades 52, support rotor 54, interface arrangements 56A-56D, inlet air A, primary air $A_P$, secondary air $A_S$ (also known as bypass air), and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various adjacent engine casings, respectively, including LPC case 26, HPC case 28, diffuser case 29 (for combustor section 18), HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through fan exit guide vanes 38, thereby producing a major portion of the thrust output of engine 10. Primary air $A_P$ (also known as gas path air) is directed first into LPC 14 and then into HPC 16. LPC 14 and HPC 16 work together to incrementally step up the pressure of primary air $A_P$ using alternating LPC stator vanes 40, LPC rotor blades 42, HPC stator vanes 44, and HPC rotor blades 46. HPC 16 is rotated by HPT 20 through low pressure shaft 34 to provide compressed air to combustor section 18. The compressed air is delivered to combustor section 18, along with fuel through injectors 48, such that a combustion process can be carried out to produce the high energy gases necessary to turn HPT 20 and LPT 22. Primary air $A_P$ continues through gas turbine engine 10 whereby it is typically passed through an exhaust nozzle to further produce thrust.

After being compressed in LPC 14 and HPC 16 and participating in a combustion process in combustor section 18 to increase pressure and energy, primary air $A_P$ flows through HPT 20 and LPT 22 such that HPT rotor blades 50 and LPT rotor blades 52 extract energy from the flow of primary air $A_P$. Primary air $A_P$ impinges on HPT rotor blades 50 to cause rotation of high pressure shaft 36, which turns HPC 16. Primary air $A_P$ also impinges on LPT rotor blades 52 to cause rotation of support rotor 54 and low pressure shaft 34, which turns fan 12 and LPC 14.

At the border of each section of gas turbine engine 10, there are interface arrangements 56A-56D. More specifically, the joint between LPC case 26 and HPC case 28 has interface arrangement 56A, the joint between HPC case 28 and diffuser case 29 has interface arrangement 56B, the joint between diffuser case 29 and HPT case 30 has interface arrangement 56C, and the joint between HPT case 30 and LPT case 32 has interface arrangement 56D. Interface arrangements 56A-56D can have essentially similar configurations, albeit incorporating different components. Interface arrangements 56A-56D allow for the different sections of gas turbine engine 10 to be joined together and provide specific benefits that will be discussed with respect to the subsequent figures.

Depicted in FIG. 1 is one embodiment of gas turbine engine 10, to which there are alternative embodiments. For example, engine 10 can be a three spool engine. In such an embodiment, engine 10 has an intermediate compressor between LPC 14 and HPC 16 and an intermediate turbine between HPT 20 and LPT 22, wherein the intermediate compressor is connected to the intermediate turbine with an additional shaft.

Figure 2:
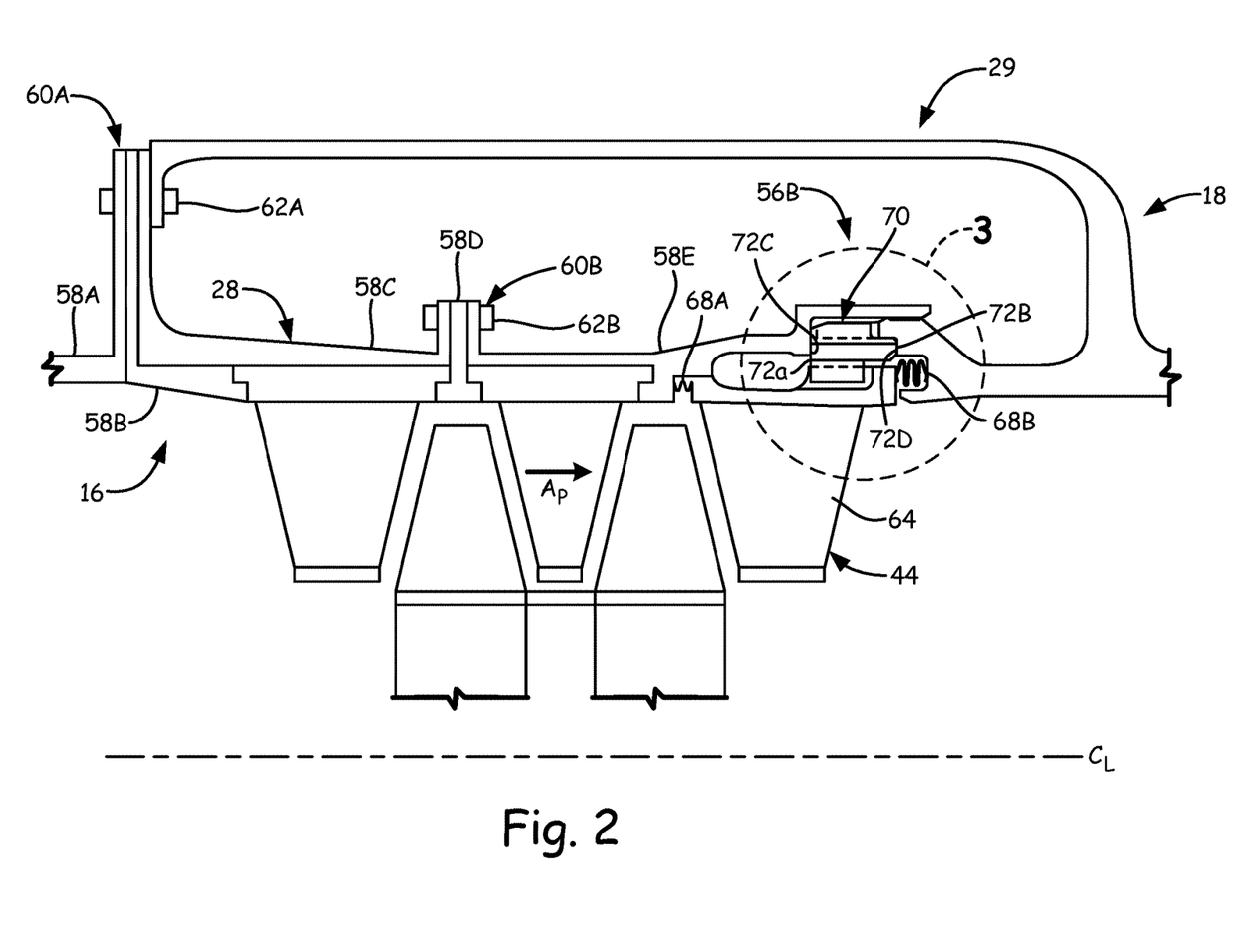
FIG. 2 is a cross-sectional view of a high pressure compressor and a combustor including an interface arrangement.

FIG. 2 is a cross-sectional view of HPC 16 and combustor section 18 including interface arrangement 56B. Shown in FIG. 2 are HPC 16, combustor section 18, HPC case 28, diffusor case 29, HPC stator vanes 44, interface arrangement 56B, case segments 58A-58E, joints 60A and 60B, fasteners 62A and 62B, snap fit joint 64, HPC exit guide vane (EGV) 66, w-seals 68A and 68B, anti-rotation (AR) shim seal 70, contact faces 72A-72D, and primary air $A_P$.

In the illustrated embodiment, HPC case 28 and diffuser case 29 both have full-ring annular shapes that extend along engine centerline axis $C_L$, and diffuser case 29 is in contact with and extends from HPC case 28. HPC case 28 comprises case segments 58A-58E which are full-ring annular segments that are adjacent and connected to the preceding and/or proceeding case segments, respectively. More specifically, case segments 58A, 58B, and 58C and diffuser case 29 are connected at joint 60A with a plurality of circumferentially-spaced fasteners 62A (although only one is visible in FIG. 2) that extend through a plurality of circumferentially-spaced holes (not shown) in case segments 58A, 58B, and 58C and diffuser case 29. Similarly, case segments 58C, 58D, and 58E are connected at joint 60B with a plurality of circumferentially-spaced fasteners 62B (although only one is visible in FIG. 2) that extend through a plurality of circumferentially-spaced holes (not shown) in case segments 58C, 58D, and 58E. Case segments 58A-58E are configured to secure HPC stator vanes 44 to the interior of HPC case 28.

As stated previously, the joint between HPC case 28 and diffuser case 29 is known as interface arrangement 56B. At interface arrangement 56B, HPC case 28 axially overlaps and is in contact with diffuser case 29 such that case segment 58E is directly radially outward from diffuser case 29 at snap fit joint 64. Prior to assembly of interface arrangement 56B, HPC case 28 has a nominally smaller inner diameter than the outer diameter of diffuser case 29 at snap fit joint 64. When joined, snap fit joint 64 has an interference fit that inhibits relative rotation of HPC case 28 with respect to diffuser case 29 due to the friction between the two components. Diffuser case 29 extends axially aft of HPC case 28 at snap fit joint 64. In addition, diffuser case 29 is attached to HPC case 28 at joint 60A, which is distal from interface arrangement 56B.

The aftmost HPC stator vane 44 is HPC EGV 66, which is positioned axially between case segment 58E and diffuser case 29 and is directly radially inward from portions of both cases 29 and 58E. In the illustrated embodiment, HPC EGV 66 is an annular full-hoop stator cascade that extends along engine centerline axis $C_L$. HPC EGV 66 is sealed on the upstream side against case segment 58E by w-seal 68A, and HPC EGV 66 is sealed on the downstream side against diffuser case 29 by w-seal 68B.

Positioned between case segment 58E, diffuser case 29, and HPC EGV 66 is AR shim seal 70. In the illustrated embodiment, AR shim seal 70 is axially aft of a portion of case segment 58E and is radially inward of a portion of case segment 58E. AR shim seal 70 is axially fore of a portion of diffuser case 29 and is radially inward of a portion of diffuser case 29. AR shim seal 70 is axially aft of a portion of HPC EGV 66 and is radially outward of a portion of HPC EGV 66. AR shim seal 70 is located proximate to snap fit joint 64 and distal from joint 60A. AR shim seal 70 is a structural member that has a full-ring annular shape and extends along engine centerline axis $C_L$. AR shim seal 70 has contact face 72A on the fore side and contact face 72B on the aft side. Contact faces 72A and 72B are continuous annular surfaces that extend perpendicularly to engine centerline axis $C_L$. Contact faces 72A and 72B are in contact with continuous, radial, annular surfaces of contact face 72C on case segment 58E and contact face 72D on diffuser case 29, respectively, thereby capturing AR shim seal 70.

The components and configuration of interface arrangement 56B as shown in FIG. 2 allow for AR shim seal 70 to seal against case segment 58E and diffuser case 29 using contact faces 72A and 72B, respectively. This inhibits or blocks primary air $A_P$ from flowing through interface arrangement 56B to the exterior of HPC case 28 and/or diffuser case 29. During operation of gas turbine engine 10 (shown in FIG. 1), the temperature at the radially inner side of interface arrangement 56B can be approximately 677° C. (1250° F.), and the pressure differential across interface arrangement 56B (including w-seal 68B) can be approximately 6.89 kPa (100 psi). Furthermore, w-seals 68A and 68B inhibit or block the flow of primary air $A_P$ from the aft end of HPC EGV 66 from going forward between HPC EGV 66 and case segment 58E and rejoining primary air $A_P$ at the fore end of HPC EGV 66. The pressure differential across this pathway can be approximately 207 kPa (30 psi).

The components and configuration of interface arrangement 56B also allow for the distance between contact faces 72A and 72B to be tightly controlled. Furthermore, AR shim seal 70 can be made with differing axial lengths, such as in increments of 0.13 mm (0.005 inches) or 0.051 mm (0.002 inches). This feature has significance because the distance between contact faces 72C and 72D, where AR shim seal resides, can vary in actual manufacturing practice due to parts tolerances. More specifically, the actual axial distance between joint 60A and contact face 72C is determined by the actual dimensions of HPC case 28 whereas the actual axial distance between joint 60A and contact face 72D is determined by the actual dimensions of diffuser case 29. Because the tolerance stacking that positions contact face 72C is unrelated to that of contact face 72D, in an assembly situation, a plurality of differently-sized AR shim seals 70 would be available and would be selected appropriately depending on a measurements of the components that affect interface arrangement 56B. This would ensure that AR shim seal 70 would contact both HPC case 28 and diffuser case 29 without being too long for joint 60A to be properly assembled. Thereby, AR shim seal 70 both seals interface arrangement 56B and shims it to the proper axial length.

Depicted in FIG. 2 is one embodiment of interface arrangement 56B, to which there are alternative embodiments. For example, HPC EGV 66 can comprise a plurality of circumferentially extending vane segments that form a cascade. For another example, only one of w-seals 68A and 68B may be present adjacent to HPC EGV 66. For yet another example, HPC EGV 66 can be another type of static structure besides a stator vane cascade. For a further example, configurations of interface arrangements 56A, 56C, and 56D (shown in FIG. 1) might include different components, such as cases, stator vanes, or other parts, but interface arrangements 56A, 56C, and 56D would have an AR shim seal. For yet a further example, snap fit joint 64 can be replaced with a tight spline to prevent relative rotation between HPC case 28 and diffuser case 29.

Figure 3:
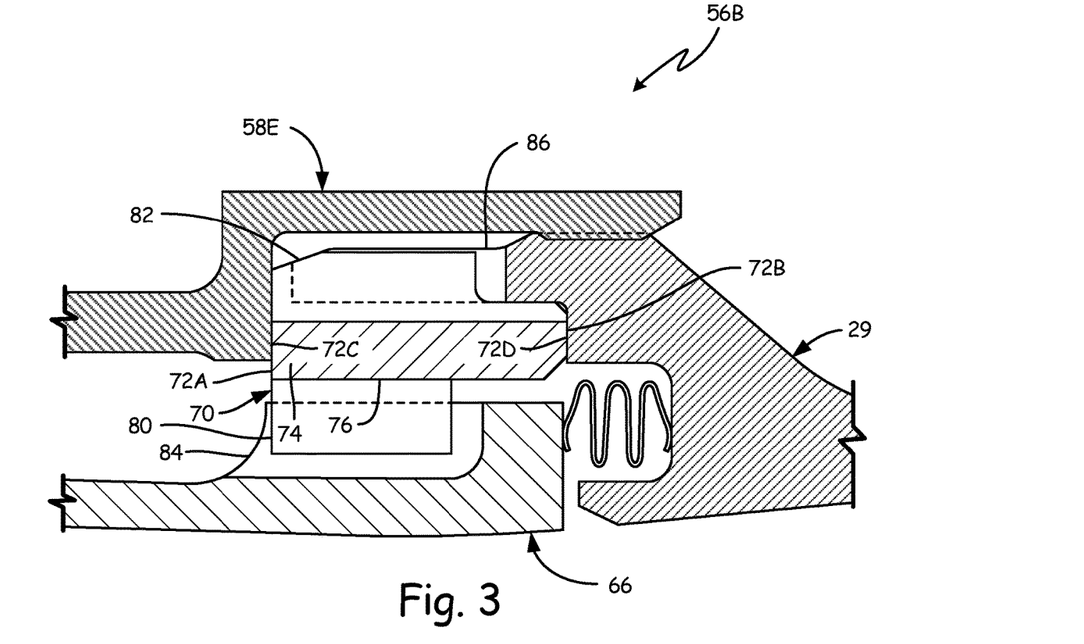
FIG. 3 is a close-up cross-sectional view of the interface arrangement, as noted by circle 3 in FIG. 2, including an anti-rotation shim seal.

FIG. 3 is a close-up cross-sectional view of interface arrangement 56B, as noted by circle 3 in FIG. 2, including AR shim seal 70. Shown in FIG. 3 are diffuser case 29, interface arrangement 56B, case segment 58E, AR shim seal 70, contact faces 72A-72D, rim 74, inner face 76, outer face 78, inner lug 80, outer lug 82, vane lug 84, and case lug 86.

As stated previously, AR shim seal 70 includes contact faces 72A and 72B. Contact faces 72A and 72B are positioned on the axial extents of rim 74. Rim 74 is the main body portion of AR shim seal 70 and has a full-ring annular shape. Rim 74 has inner face 76 on its radially inner extent and outer face 78 on its radially outer extent, and faces 76 and 78 extend parallel to engine centerline axis $C_L$ (shown in FIG. 1).

In the illustrated embodiment, AR shim seal 70 includes inner lug 80 that extends radially inward, perpendicular to engine centerline axis $C_L$, from inner face 76. AR shim seal 70 also includes outer lug 82 that extends radially outward, perpendicular to engine centerline axis $C_L$, from outer face 78. Lugs 80 and 82 are anti-rotation features that subtend only a portion of the circumference of rim 74. Lugs 80 and 82 have fore ends that are planar with contact face 72A, although lugs 80 and 82 have aft ends that are rebated forward from contact face 72B. Alternatively, lugs 80 and 82 can have fore ends that are aft of contact face 72A and/or lugs 80 and 82 can have aft ends that are planar with contact face 72B.

In addition, HPC EGV 66 includes vane lug 84 that extends radially outward, perpendicular to engine centerline axis $C_L$, and diffuser case 29 includes case lug 86 that extends axially forward, parallel to engine centerline axis $C_L$. Lugs 84 and 86 are anti-rotation features that subtend only a portion of HPC EGV 66 and diffuser case 29, respectively. Lugs 84 and 86 are circumferentially offset from lugs 80 and 82, respectively, such that inner lugs 80 are alternately positioned in interface arrangement 56B from vane lugs 84 and outer lugs 82 are alternately positioned from case lugs 86. More specifically, each inner lug 80 is positioned between two vane lugs 84 and each vane lug 84 is positioned between two inner lugs 80. Similarly, each outer lug 82 is positioned between two case lugs 86 and each case lug 86 is positioned between two outer lugs 82. Therefore, lugs 84 and 86 are circumferentially engaged by lugs 80 and 82, respectively, to interfere with relative rotation between HPC EGV 66 and AR shim seal 70 and between AR shim seal 70 and diffuser case 29.

The components and configuration of interface arrangement 56B as shown in FIG. 3 allow for relative radial location to be maintained between HPC EGV 66 and diffuser case 29 and thereby also between HPC EGV 66 and case segment 58E.

Figure 4:
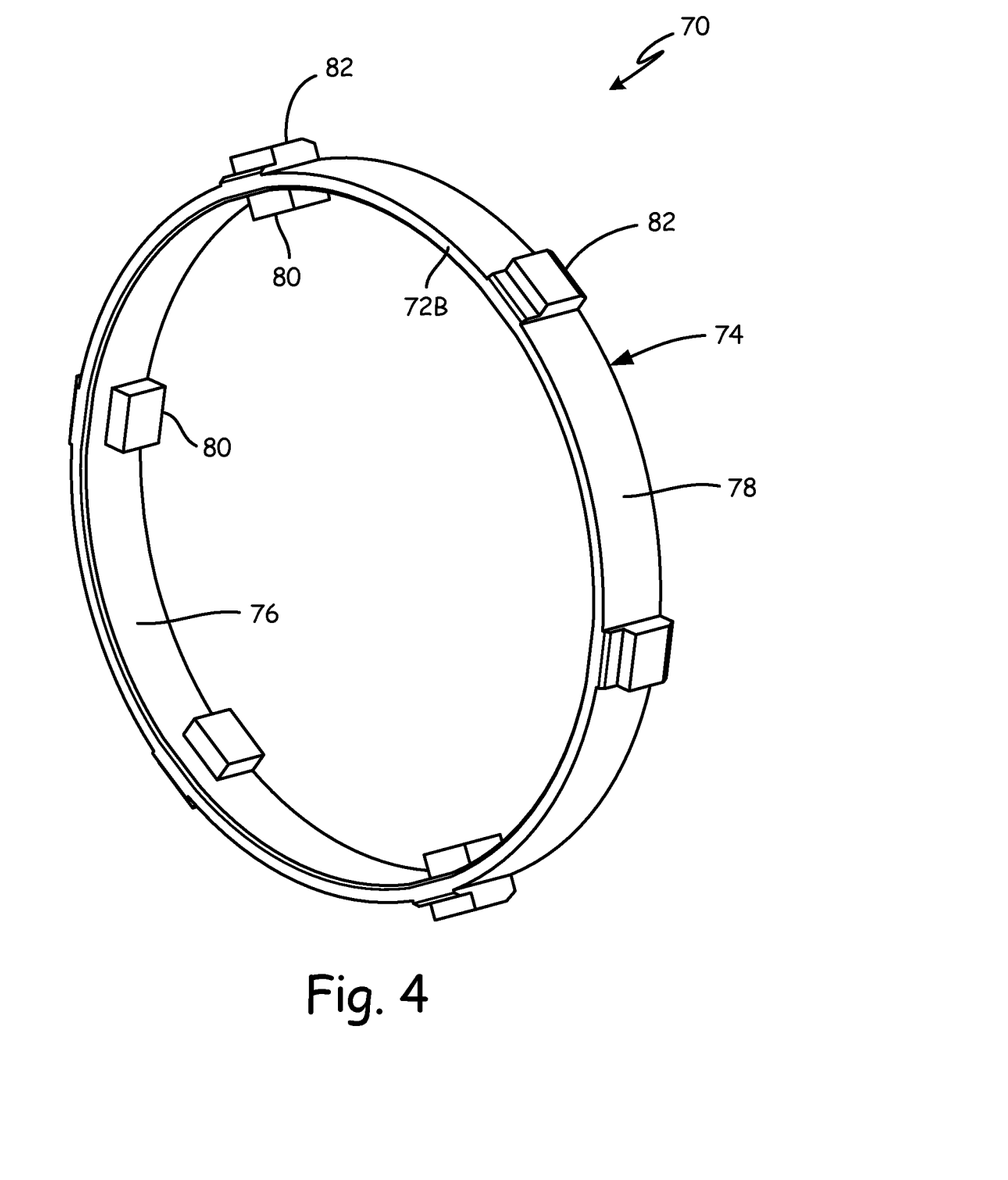
FIG. 4 is an aft perspective view of the anti-rotation shim seal.

FIG. 4 is an aft perspective view of AR shim seal 70. Shown in FIG. 4 are AR shim seal 70, contact face 72B, rim 74, inner face 76, outer face 78, inner lug 80, and outer lug 82.

In the illustrated embodiment, a plurality of inner lugs 80 and a plurality of outer lugs 82 are visible, with each of inner lugs 80 and outer lugs 82 being circumferentially spaced apart, respectively. The array of inner lugs 80 are circumferentially coincident with the array of outer lugs 82 such that each inner lug 80 extends from inner face 76 opposite of rim 74 from an outer lug 82 that extends from outer face 78. In this illustrated embodiment, there are six pairs of evenly circumferentially spaced lugs 80 and 82, with all of lugs 80 and 82 being substantially the same size. To engage lugs 80 and 82 when AR shim seal 70 is installed in interface arrangement 56B, a plurality of vane lugs 84 would be present on HPC EGV 66 and a plurality of case lugs 86 would be present on diffuser case 29. Each of the vane lugs 84 would extend between two inner lugs 80, and each of the case lugs 86 would extend between two outer lugs 82 to prevent relative rotation between HPC EGV 66 and diffuser case 29 (all shown in FIG. 3). Alternatively, a circumferentially shorter vane lug 84 would be positioned on each side of each of inner lugs 80, and/or a circumferentially shorter case lug 86 would be positioned on each side of each of outer lugs 82 to reduce the weight of HPC EGV 66 and/or diffuser case 29.

AR shim seal 70 is made from a nickel-based metal alloy (such as Waspaloy or 718). AR shim seal 70 can have an anti-wear coating applied globally or locally, such as on the sides of lugs 80 and 82 that engage lugs 84 and 86 (shown in FIG. 3), respectively. The hardness of AR shim seal 70 (with or without a coating) can be made softer than lugs 84 and 86 so that AR shim seal 70 would wear out faster than HPC EGV 66 or diffuser case 29 (shown in FIG. 3) during use. AR shim seal 70 can be manufactured using several methods, such as billet machining, forging, casting, and additive manufacturing.

The configuration of AR shim seal 70 as shown in FIG. 4 allows for all three functions of sealing, shimming, and anti-rotation to be performed by a single, monolithic component. Depicted in FIG. 4 is one embodiment of AR shim seal 70, to which there are alternative embodiments. For example, each of inner lugs 80 can be circumferentially offset from an outer lug 82, and/or there can be different numbers of lugs 80 and 82. For another example, inner lugs 80 can be differently sized from each other and/or from outer lugs 82 (which can also be differently sized from each other). In such an embodiment, vane lugs 84 and case lugs 86 (shown in FIG. 3) would need to be sized and spaced appropriately, which can be utilized to key AR shim seal 70 into being installed in only one particular circumferential orientation Discussion of Possible Embodiments The following are non-exclusive descriptions of possible embodiments of the present invention.

An interface arrangement according to an exemplary embodiment of this disclosure, among other possible things, includes a first component having a first annular shape that extends along an axis; a second component having a second annular shape that extends along the axis, the second component being in contact with the first component and extending axially from the first component; a third component positioned radially inward of at least a first portion of the first component and at least a second portion of the second component; a first anti-rotation feature included on one of the first component, the second component, and the third component; and a seal member having an annular shape that extends along the axis, the seal member being in contact with the first component and the second component and being positioned between the third component and at least one of the first component and the second component, the seal member including a second anti-rotation feature configured to engage the first anti-rotation feature.

The interface arrangement of the preceding paragraph can optionally include, additionally and/or alternatively, any one or more of the following features, configurations and/or additional components:

A further embodiment of the foregoing interface arrangement, wherein the interface arrangement can further comprise: a third anti-rotation feature included on another one of the first component, the second component, and the third component; and a fourth anti-rotation feature included on the seal member configured to engage the third anti-rotation feature.

A further embodiment of any of the foregoing interface arrangements, wherein the seal member can comprise: a body having a first side, a second side, a third side opposite of the first side, and a fourth side opposite of the second side; wherein the first anti-rotation feature extends from the first side and the third anti-rotation feature extends from the third side.

A further embodiment of any of the foregoing interface arrangements, wherein the first and third sides can extend perpendicular to the axis and the second and fourth sides extend parallel to the axis.

A further embodiment of any of the foregoing interface arrangements, wherein the second side can be continuous and can be in contact with a first continuous face of the first component; and the fourth side can be continuous and can be in contact with a second continuous face of the second component.

A further embodiment of any of the foregoing interface arrangements, wherein the first anti-rotation feature can comprise a first plurality of lugs, the second anti-rotation feature can comprise a second plurality of lugs, the third anti-rotation feature can comprise a third plurality of lugs, and the fourth anti-rotation feature can comprise a fourth plurality of lugs.

A further embodiment of any of the foregoing interface arrangements, wherein the first, second, and fourth pluralities of lugs can extend perpendicular to the axis and the third plurality of lugs can extend parallel to the axis.

A further embodiment of any of the foregoing interface arrangements, wherein the first component can be attached to the second component distal from the interface arrangement.

A further embodiment of any of the foregoing interface arrangements, wherein the seal member can be configured to inhibit fluid flow through the interface arrangement.

A further embodiment of any of the foregoing interface arrangements, wherein the interface arrangement can further comprise: a second seal positioned between the second component and the third component radially inward of the seal member.

A gas turbine engine extending along an axis according to an exemplary embodiment of this disclosure, among other possible things, includes: a compressor, the compressor comprising: a first compressor case; a second compressor case adjacent to the first compressor case; and a compressor component connected to one of the first and second compressor cases; a combustor downstream of the compressor, the combustor comprising: a combustor case adjacent to the second compressor case; and a combustor component connected to the combustor case; a turbine downstream of the combustor, the combustor comprising: a first turbine case adjacent to the combustor case; a second turbine case adjacent to the first turbine case; and a turbine component connected to one of the first and second turbine cases; and a seal member positioned at one of the following interfaces: the first and second compressor cases, the second compressor case and the combustor case, the combustor case and the first turbine case, and the first and second turbine cases, wherein: the seal member is positioned to interfere with relative movement between one of the compressor component, the combustor component, and the turbine component with respect to one of the first and second compressor cases, the combustor case, and the first and second turbine cases; and the seal member is positioned to block fluid flow between relative movement between one of the first and second compressor cases, the second compressor case and the combustor case, the combustor case and the first turbine case, and the first and second turbine cases.

The gas turbine engine of the preceding paragraph can optionally include, additionally and/or alternatively, any one or more of the following features, configurations and/or additional components:

A further embodiment of the foregoing gas turbine engine, wherein the compressor component can be a compressor stator vane and the turbine component can be a turbine stator vane.

A further embodiment of any of the foregoing gas turbine engines, wherein the seal member can further comprise: a plurality of inner lugs configured to engage a plurality of component lugs on one of the compressor component, the combustor component, and the turbine component; and a plurality of outer lugs configured to engage a plurality of case lugs on one of the first and second compressor cases, the second compressor case and the combustor case.

A further embodiment of any of the foregoing gas turbine engines, wherein the compressor component can be radially inside of one of the first and second compressor cases; the combustor component can be radially inside the combustor case; the turbine component can be radially inside of one of the first and second turbine cases; and the seal member can be positioned to block inhibit fluid flow from one of the compressor component, the combustor component, and the turbine component to an exterior of one of the first and second compressor cases, the combustor case, and the first and second turbine cases.

A further embodiment of any of the foregoing gas turbine engines, wherein the seal member can be positioned between the second compressor case and the combustor case, and wherein the compressor component can be a compressor vane.

A further embodiment of any of the foregoing gas turbine engines, wherein the second compressor case and the combustor case can be connected using a snap fit joint proximate to the seal member; and the second compressor case and the combustor case can be connected using a plurality of fasteners distal to the seal member.

A further embodiment of any of the foregoing gas turbine engines, wherein the seal member can comprise a first plurality of lugs extending radially inward and a second plurality of lugs extending radially outward; the combustor case can comprise a third plurality of lugs extending forward to engage the second plurality of lugs; and the compressor component can comprise a fourth plurality of lugs facing radially outward to engage the first plurality of lugs.

A further embodiment of any of the foregoing gas turbine engines, wherein the gas turbine engine can further comprise: a second seal positioned between the combustor case and the compressor component radially inward of the seal member.

A further embodiment of any of the foregoing gas turbine engines, wherein the second compressor case can overlap the combustor case such that a portion of the second compressor case is directly radially outward of the combustor case.

A further embodiment of any of the foregoing gas turbine engines, wherein the combustor case can overlap the compressor component such that a portion of the combustor case is directly radially outward of the compressor component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An interface arrangement comprising:
 a first component having a first annular shape that extends along an axis;
 a second component having a second annular shape that extends along the axis, the second component being in contact with the first component and extending axially from the first component;
 a third component positioned radially inward of at least a first portion of the first component and at least a second portion of the second component;
 a first anti-rotation feature included on the third component
 a seal member having an annular shape that extends along the axis, the seal member being in contact with the first component and the second component and being positioned between the third component and at least one of the first component and the second component, the seal member including a second anti-rotation feature extending radially inward and configured to engage the first anti-rotation feature;
 a third anti-rotation feature included on one of the first component and the second component;
 a fourth anti-rotation feature included on the seal member and configured to engage the third anti-rotation feature;
 wherein the first anti-rotation feature comprises a first plurality of lugs, the second anti-rotation feature comprises a second plurality of lugs, the third anti-rotation feature comprises a third plurality of lugs, and the fourth anti-rotation feature comprises a fourth plurality of lugs; and
 wherein the first and fourth pluralities of lugs extend radially outward and the third plurality of lugs extends axially from the one of the first component and second component.

2. The interface arrangement of claim 1, wherein the seal member comprises:
 a body having a first side, a second side, a third side opposite of the first side, and a fourth side opposite of the second side;
 wherein the first anti-rotation feature extends from the first side and the third anti-rotation feature extends from the third side.

3. The interface arrangement of claim 2, wherein the first and third sides extend axially and the second and fourth sides extend radially.

4. The interface arrangement of claim 2, wherein:
 the second side is continuous and is in contact with a first continuous face of the first component; and
 the fourth side is continuous and is in contact with a second continuous face of the second component.

5. The interface arrangement of claim 1, wherein the first component is attached to the second component distal from the interface arrangement.

6. The interface arrangement of claim 1, wherein the seal member is configured to inhibit fluid flow through the interface arrangement.

7. The interface arrangement of claim 1, further comprising:
 a second seal positioned between the second component and the third component radially inward of the seal member.

8. The interface arrangement of claim 1, wherein the second plurality of lugs are circumferentially coincident with the fourth plurality of lugs.

9. A gas turbine engine extending along an axis, the gas turbine engine comprising:
 a compressor, the compressor comprising:
  a first compressor case;
  a second compressor case adjacent to the first compressor case; and
  a compressor component connected to one of the first and second compressor cases;
 a combustor downstream of the compressor, the combustor comprising:
  a combustor case adjacent to the second compressor case; and
  a combustor component connected to the combustor case;
 a turbine downstream of the combustor, the combustor comprising:
  a first turbine case adjacent to the combustor case; a second turbine case adjacent to the first turbine case; and
  a turbine component connected to one of the first and second turbine cases;
 a first anti-rotation feature; and
 a seal member positioned at one of the following interfaces: the first and second compressor cases, the second compressor case and the combustor case, the combustor case and the first turbine case, and the first and second turbine cases, wherein:
  the seal member is positioned to interfere with relative movement between one of the compressor component, the combustor component, and the turbine component with respect to one of the first and second compressor cases, the combustor case, and the first and second turbine cases;
  the seal member is positioned to block fluid flow between relative movement between one of the first and second compressor cases, the second compressor case and the combustor case, the combustor case and the first turbine case, and the first and second turbine cases;
  the seal member comprises a first plurality of lugs extending radially inward and a second plurality of lugs extending radially outward;
  the combustor case comprises a third plurality of lugs extending forward to engage the second plurality of lugs; and the compressor component comprises a fourth plurality of lugs facing radially outward to engage the first plurality of lugs.

10. The gas turbine engine of claim 9, wherein the compressor component is a compressor stator vane and the turbine component is a turbine stator vane.

11. The gas turbine engine of claim 9, wherein the seal member further comprises:
a plurality of inner lugs configured to engage a plurality of component lugs on one of the compressor component, the combustor component, and the turbine component; and
a plurality of outer lugs configured to engage a plurality of case lugs on one of the first and second compressor cases, the second compressor case and the combustor case.

12. The gas turbine engine of claim 9, wherein:
the compressor component is radially inside of one of the first and second compressor cases;
the combustor component is radially inside the combustor case;
the turbine component is radially inside of one of the first and second turbine cases; and
the seal member is positioned to block inhibit fluid flow from one of the compressor component, the combustor component, and the turbine component to an exterior of one of the first and second compressor cases, the combustor case, and the first and second turbine cases.

13. The gas turbine engine of claim 9, wherein the seal member is positioned between the second compressor case and the combustor case, and wherein the compressor component is a compressor vane.

14. The gas turbine engine of claim 13, wherein
the second compressor case and the combustor case are connected using a snap fit joint proximate to the seal member; and
the second compressor case and the combustor case are connected using a plurality of fasteners distal to the seal member.

15. The gas turbine engine of claim 13, and further comprising:
a second seal positioned between the combustor case and the compressor component radially inward of the seal member.

16. The gas turbine engine of claim 13, wherein the second compressor case overlaps the combustor case such that a portion of the second compressor case is directly radially outward of the combustor case.

17. The gas turbine engine of claim 13, wherein the combustor case overlaps the compressor component such that a portion of the combustor case is directly radially outward of the compressor component.

* * * * *